United States Patent
Rosenbluth et al.

(10) Patent No.: US 12,525,358 B2
(45) Date of Patent: Jan. 13, 2026

(54) CHRONIC PAIN MANAGEMENT THROUGH DIGITAL THERAPY SYSTEM

(71) Applicant: Swing Therapeutics, Inc., San Francisco, CA (US)

(72) Inventors: Michael Rosenbluth, San Francisco, CA (US); Jeremy Frank, San Francisco, CA (US); Nelson Mitchell, San Francisco, CA (US); Eric Hoppe, Oakland, CA (US)

(73) Assignee: Swing Therapeutics, Inc., San Francisco, CA (US)

( * ) Notice: Subject to any disclaimer, the term of this patent is extended or adjusted under 35 U.S.C. 154(b) by 166 days.

(21) Appl. No.: 18/062,398

(22) Filed: Dec. 6, 2022

(65) Prior Publication Data

US 2023/0178247 A1 Jun. 8, 2023

Related U.S. Application Data

(60) Provisional application No. 63/347,205, filed on May 31, 2022, provisional application No. 63/286,534, filed on Dec. 6, 2021.

(51) Int. Cl.
*G16H 50/30* (2018.01)
*G16H 10/20* (2018.01)
*G16H 50/70* (2018.01)

(52) U.S. Cl.
CPC ............. *G16H 50/30* (2018.01); *G16H 50/70* (2018.01); *G16H 10/20* (2018.01)

(58) Field of Classification Search
None
See application file for complete search history.

(56) References Cited

U.S. PATENT DOCUMENTS 11,127,506 B1 9/2021 Jain et al.
2004/0122707 A1* 6/2004 Sabol ................... G16H 10/60
707/999.009

(Continued)

FOREIGN PATENT DOCUMENTS

WO WO-2019071098 A2 * 4/2019 ............... G06N 5/01

OTHER PUBLICATIONS

Benjamens, Stan, et al., "The state of artificial intelligence-based FDA-approved medical devices and algorithms: an online database", NPJ Digital Medicine, 3, 118, (2020), Seoul National University Bundang Hospital (Year: 2020).*

(Continued)

*Primary Examiner* — Amber A Misiaszek
(74) *Attorney, Agent, or Firm* — Fenwick & West LLP

(57) ABSTRACT

The digital therapy system collects data about the user from a user device. For example, the digital therapy system may collect data about the user's physical and mental health from the user through the user device. The digital therapy system then generates biomarker characteristics for the user. Biomarker characteristics are characteristics that describe a user's FM. The digital therapy system may generate the biomarker characteristics for a user by applying a biomarker model to data about the user. The digital therapy system can use the biomarker characteristics to determine a treatment plan for the user. A treatment plan is a set of treatment assignments that aid a user in alleviating or coping with symptoms from their FM in accordance with CBT techniques. The digital therapy system may also adjust the treatment plan for the user based on additional data that the digital therapy system receives.

15 Claims, 3 Drawing Sheets

(56) References Cited

U.S. PATENT DOCUMENTS

| | | | | |
|---|---|---|---|---|
| 2010/0228314 A1* | 9/2010 | Goetz | ............... | A61N 1/36071 |
| | | | | 607/46 |
| 2011/0021883 A1* | 1/2011 | Young | .................... | G06Q 30/00 |
| | | | | 600/300 |
| 2014/0279746 A1* | 9/2014 | De Bruin | ............... | G16H 50/70 |
| | | | | 706/46 |
| 2015/0301055 A1 | 10/2015 | Spetzler | | |
| 2015/0364057 A1 | 12/2015 | Catani et al. | | |
| 2017/0098032 A1* | 4/2017 | Desai | ..................... | G16B 50/00 |
| 2017/0242962 A1* | 8/2017 | Lenchitsky | ............ | G16H 70/40 |
| 2019/0035494 A1* | 1/2019 | Zhang | ................... | G16H 20/10 |
| 2019/0362846 A1* | 11/2019 | Vodencarevic | ........ | G16H 50/20 |
| 2021/0217508 A1* | 7/2021 | Kosofsky | ............... | G16H 10/60 |
| 2022/0028541 A1* | 1/2022 | Paull | ..................... | G16H 20/10 |

OTHER PUBLICATIONS

PCT International Search Report and Written Opinion, PCT Application No. PCT/US22/52017, Mar. 8, 2023, nine pages.

\* cited by examiner

CHRONIC PAIN MANAGEMENT THROUGH DIGITAL THERAPY SYSTEM

CROSS-REFERENCE TO RELATED APPLICATION

This application claims the benefit of U.S. Provisional Patent Application No. 63/286,534, filed Dec. 6, 2021, and U.S. Provisional Patent Application No. 63/347,205, filed May 31, 2022, which are each incorporated by reference.

BACKGROUND

Fibromyalgia (FM) is a medical condition where an individual suffers from chronic musculoskeletal pain. Other symptoms of FM may include headaches, fatigue, insomnia, memory issues, or mood issues. FM is often caused by a significant event, such as physical trauma, surgery, an infection, or psychological stress. While there are methods by which individuals with FM can alleviate their conditions, there is currently no cure for FM.

Individuals with FM often struggle to find treatments that manage their conditions. Many pharmacological solutions can be ineffective at addressing pain (such as over-the-counter painkillers) or may not be feasible long-term solutions (such as opioids). Additionally, pharmacological solutions may require a doctor's prescription to obtain, and thus it may be difficult to try different solutions when a current solution is not effective. Furthermore, pharmacological solutions that are effective at addressing a patient's day-to-day pain may not be as effective at addressing a flare-up (i.e, a temporary increase in severity of a user's pain).

Some cognitive behavioral therapy (CBT) techniques may help a patient come to terms with their pain or to lessen their pain through improved mental health. However, conventional CBT techniques may require a therapist or other professional to determine which assignments the individual should complete. A therapist or other professional also often lacks up-to-date information about their patient because they are not in constant communication with their patient. Further, the patient may not always be the best source of information about whether they have completed recommended assignments.

SUMMARY

A digital therapy system provides a customized treatment plan to a user suffering from FM. The digital therapy system collects data about the user from a user device. For example, the digital therapy system may collect data about the user's physical and mental health from the user through the user device. The digital therapy system then generates biomarker characteristics for the user. Biomarker characteristics are characteristics that describe a user's FM. For example, biomarker characteristics may describe the severity of the user's FM, likely triggers for the user's FM to flare up, or even predict whether the user has FM but is not aware of it. The digital therapy system may generate the biomarker characteristics for a user by applying a biomarker model to data about the user. The biomarker model is one or more machine-learning models that have been trained to generate biomarker characteristics for a user based on data about the user.

The digital therapy system can use the biomarker characteristics to determine a treatment plan for the user. A treatment plan is a set of treatment assignments that aid a user in alleviating or coping with symptoms from their FM in accordance with CBT techniques. For example, the treatment plan may include talk therapy sessions, meditation sessions, skill building modules, tasks, or plans for the user. The digital therapy system may also adjust the treatment plan for the user based on additional data that the digital therapy system receives. For example, the digital therapy system may adjust the treatment plan based on a prediction that the user's FM will flare up to minimize the impact on the user of the flare up.

By providing automated, up-to-date, and personalized CBT tasks to a user with FM, the digital therapy system allows a user to more effectively use CBT as a method for managing their FM symptoms, thereby reducing their reliance on pharmacological solutions or therapy sessions with a therapist. Similarly, the digital therapy system can proactively predict whether a user may experience more severe symptoms and recommend preventative tasks for the user to perform, thereby improving the user's quality of life.

DETAILED DESCRIPTION

Figure 1:
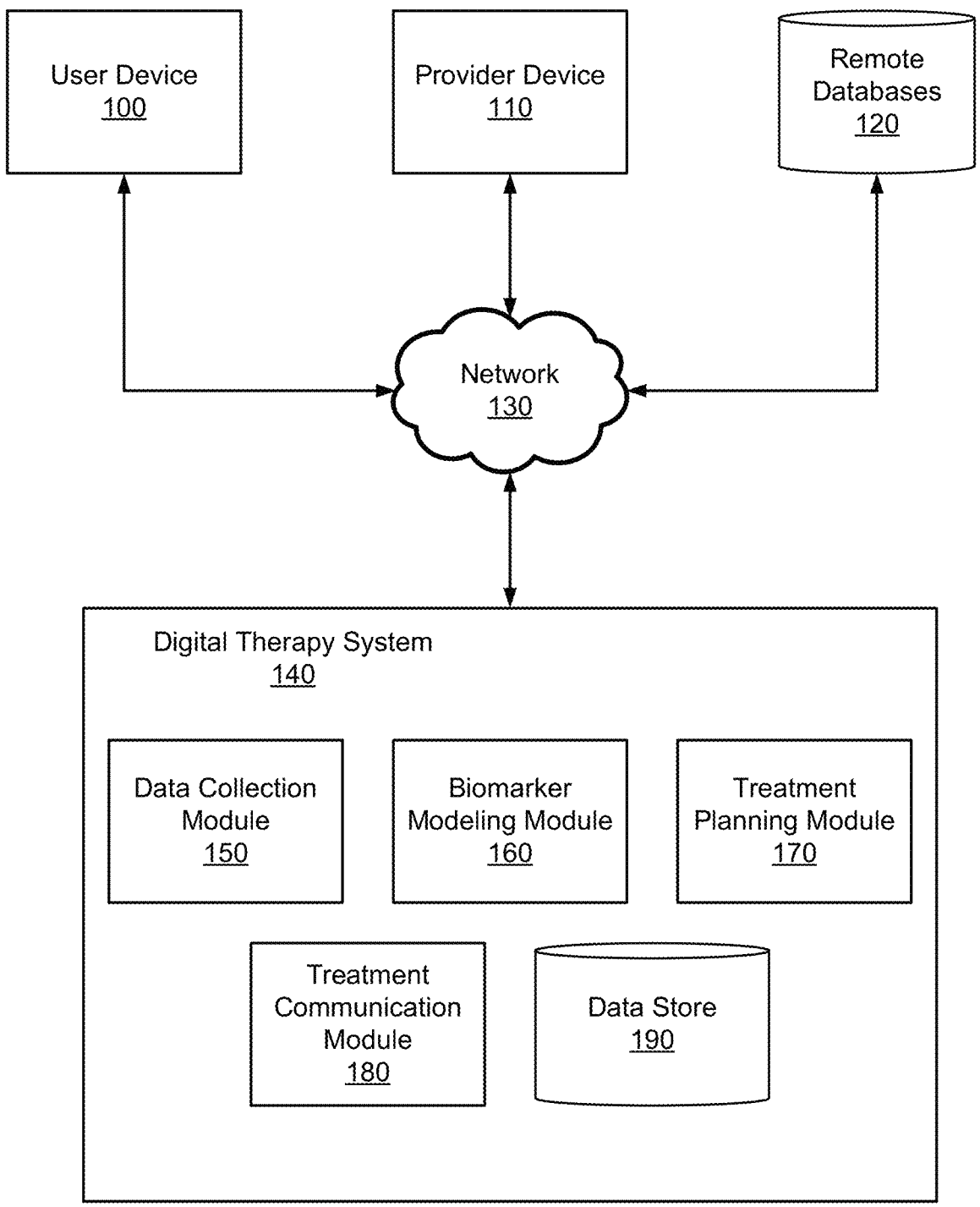
FIG. 1 illustrates an example system environment for a digital therapy system 140, in accordance with some embodiments.

Figure (FIG. 1 illustrates an example system environment for a digital therapy system 140, in accordance with some embodiments. The system environment illustrated in FIG. 1 includes a user device 100, a provider device 110, one or more remote databases 120, a network 130, and a digital therapy system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention. Furthermore, while the description below of the digital therapy system 140 may focus on FM, other embodiments of the digital therapy system 140 may assist users with other chronic conditions, like diabetes, arthritis, irritable bowel syndrome, rheumatoid arthritis, osteoarthritis, migraines, back/joint pain, or other chronic pain or autoimmune conditions.

A user can interact with the digital therapy system 140 through a user device 100. The user device 100 can be a personal or mobile computing device, such as a smartphone, a tablet, a laptop computer, or desktop computer. In some embodiments, the user device 100 executes a client application that uses an application programming interface (API) to communicate with the digital therapy system 140 through the network 130.

The user device 100 collects user data from a user. User data is information describing the user that the digital therapy system 140 uses to determine a treatment plan for a user's FM. The user data may include the user's physical or mental health (e.g., comorbidities, autoimmune diseases, acute physical injury, stress levels), ethnicity, gender or sex, age, the user's personal and family medical history, patient reported outcomes measures or surveys (across mental health status, physical health status, quality of life metrics, disease severity, or others), their diet, their weight, their height, sleep quality or quantity, the user's physical movements or activities, the user's sociability, location data describing the user's location, the user's sensitivity to stimuli (e.g., touch, temperature, or sound), or the user's use of, compliance with, or dosage of past or present medications. User data may include information about the user's pain or other FM symptoms, such as where the user experienced pain, when the user experienced pain, an intensity of pain experienced by the user, a type of pain (e.g., achy, dull, raw, sharp, stabbing, or throbbing), or how the user's pain impacted their ability to partake in normal activities.

User data may also include information about a user's interactions with the digital therapy system 140. For example, the user data may include information about how often the user performs recommended treatment assignments, how well the user performs those treatment assignments, which treatment assignments the user is performing, the user's opinions on the treatment assignments, the user's engagement with the treatment assignments, or the user's opinions of their performance of recommended treatment.

In some embodiments, the user device 100 collects user data by using a user application that operates on the user device 100. The user application may automatically collect user data and may collect user data provided directly by the user. Additionally, the user device 100 may collect user data by connecting with wearable devices (e.g., a smart watch/wristband, fitness trackers, or body-mounted sensors) that the user wears and has connected to the user device.

The provider device 110 is a device used by a healthcare provider to interact with the digital therapy system 140. A healthcare provider is a person or entity who provides healthcare services to the user. Example medical providers include doctors of medicine, doctors of osteopathy, hospitals, clinics, podiatrists, dentists, chiropractors, clinical psychologists, physical therapists, mental health therapists, optometrists, nurse practitioners, or clinical social workers.

The provider device 110 can be a personal or mobile computing device, such as a smartphone, a tablet, a laptop computer, or desktop computer. In some embodiments, the provider device 110 executes a client application that uses an application programming interface (API) to communicate with the digital therapy system 140 through the network 130. In some embodiments, the provider device 110 is one or more computer systems used by the healthcare provider in the performance of their healthcare services.

The provider device 110 may collect user data about the user held by the provider and transmit the user data to the digital therapy system 140. For example, the provider device 110 may collect the user's medical history held by the medical provider and transmit the medical history to the digital therapy system 140. The provider device 110 may automatically transmit user data to the digital therapy system 140.

The provider device 110 may also provide information from the digital therapy system 140 to the provider. For example, the provider device 110 may update the provider with information about how well or how often a user performs their treatment assignments or with information about the user's mental health that the user provides the digital therapy system 140. Additionally, the provider may provide messages to the user regarding the user's health using the provider device 110 by transmitting the messages to the digital therapy system 140 to be displayed to the user on the user device 100.

The digital therapy system 140 may receive data from one or more remote databases 120 to determine a treatment plan for a user. For example, the digital therapy system 140 may receive user data from one or more databases that store user data for the user. Additionally, the remote databases 120 may include publicly accessible databases to provide data to the public for free or at a cost. For example, the remote databases 120 may include databases that store anonymized user data from people with FM or other conditions, data from studies conducted on people with FM or other conditions, publicly available databases of people with FM or other conditions, weather data, epidemiologic data, infectious disease data, or GPS data.

The user device 100, the provider device 110, and the remote databases 120 communicate with digital therapy system 140 via the network 130, which may comprise any combination of local area and wide area networks employing wired or wireless communication links. In some embodiments, the network 130 uses standard communications technologies and protocols. For example, the network 130 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any format, such as hypertext markup language (HTML) or extensible markup language (XML). In some embodiments, all or some of the communication links of the network 130 may be encrypted.

FIG. 1 also illustrates an example system architecture of a digital therapy system 140, in accordance with some embodiments. The digital therapy system 140 illustrated in FIG. 1 includes a data collection module 150, a biomarker modeling module 160, a treatment planning module 170, a treatment communication module 180, and a data store 190. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The data collection module 150 collects data used by the digital therapy system 140. The data collection module 150 may collect data from the user device 100, the provider device 110, and the remote databases 120. For example, the data collection module 150 may collect user data from the user device 100. The data collection module 150 also may collect data based on a user's interactions with the digital therapy system 140. For example, the data collection module 150 may collect responses provided by the user to the digital therapy system 140 as part of treatment assignments or may collect data describing the user's performance of treatment assignments. The data collection module 150 stores collected data in the data store 190.

The biomarker modeling module 160 applies one or more biomarker models to determine biomarker characteristics of the user. Biomarker characteristics are characteristics that describe a user's FM and associated health status. For example, biomarker characteristics may include a user's likelihood of having FM, characteristics of a user's diagnosis of FM, a likelihood of a user experiencing symptoms of FM within a timeframe, or the severity of a user's FM or components of FM or other relevant disease metrics (e.g. depression, anxiety), or status of behavioral therapy related metrics (e.g. mindfulness, psychological flexibility).

A biomarker model is a machine learning model (e.g., a neural network) that is trained to determine biomarker characteristics of a user based on user data associated with the user. For example, a biomarker model may be trained to predict the severity of a user's FM symptoms within a 24-hour period based on historical data of the user's FM symptoms. A biomarker model may be trained to correlate user data with other data to determine biomarker characteristics of a user. For example, a biomarker model may be trained to correlate data about the weather and data about a user's recent physical activity to predict whether a user is likely to experience a flareup in FM symptoms. A biomarker model may also predict biomarker characteristics for a user based on treatments that the user has been provided by the digital therapy system 140. For example, a biomarker model may predict a lower severity of a user's FM symptoms if the user has completed a set of treatment assignments.

The biomarker modeling module 160 trains biomarker models based on training data. Training data for a biomarker model may include user data describing information about a user, historical weather data, location data, or data from studies conducted by third parties. The user data may describe user symptoms over time, user activity, user medical history, user medications and medication adherence, user sleep data, user psychological inflexibility (e.g., the user's pain acceptance or level of mindfulness), user kinesiophobia, or user sociability. The user data may be collected based on user reported surveys collected from the user.

In some embodiments, the user's sociability is measured based on a number of wireless networks that the user device 100 interacts with. For example, a client application operating on the user device 100 may detect when the user device 100 interacts with a wireless network, such as a WiFi network or a Bluetooth network. The client application may collect data describing the number of times the user device 100 connects with a new wireless network within a time period as a measure of how sociable the user has been within that time period, and may thereby use that data to train the biomarker model.

In some embodiments, a biomarker model is trained based on user data from multiple users of the digital therapy system 140. In these embodiments, the biomarker model may be trained to make predictions about the biomarker characteristics of one user based on data about similar users. For example, a biomarker model may predict a severity of a user's FM symptoms based on other users with similar characteristics (e.g., age, sex, physical conditioning, medical history, or activity level) to the user.

In some embodiments, the training data includes labels for training examples that are used to train a biomarker model. For example, training data may include a set of training examples, where each example includes user data for a user. Each training example may be labeled with a severity score describing a user's severity of FM symptoms, or may be labeled with a likelihood score describing a likelihood that a user has FM based on the user data.

In some embodiments, the training data for a biomarker model may be preprocessed. For example, the biomarker modeling module 160 may featurize the training data, normalize the training data, remove training examples that are missing important pieces of information, anonymize the training data, or remove anomalous training data. The biomarker modeling module 160 may apply weights to different training examples in the training data based on a target user demographic for the digital therapy system 140. For example, the biomarker modeling module 160 may apply weights to emphasize training examples for users who most commonly use the digital therapy system 140, or may apply weights for users who do not commonly use the digital therapy system 140 and for whom the digital therapy system 140 lacks sufficient training data.

In some embodiments, to train a biomarker model, the biomarker modeling module 160 generates feature sets or embeddings based on the training data. For example, the biomarker modeling module 160 may generate an embedding based on user data, an embedding based on weather data, and an embedding based on treatment assignments performed by the user, and these embedding may be used to train a biomarker model.

In some embodiments, the biomarker modeling module 160 may retrain a biomarker model based on new data received by the digital therapy system 140 in the course of providing treatment to a user. For example, if a biomarker model predicts that a user will have more severe symptoms than normal during a particular timeframe, but the user reports regular or low symptoms during that timeframe, the biomarker modeling module 160 may retrain the biomarker model based on user data from that time period.

The biomarker modeling module 160 may receive training data from the user device 100, the provider device 110, or the remote databases 120. The training data also may include data from users of the digital therapy system 140 or may include data from other individuals with FM.

In some embodiments, the biomarker modeling module 160 predicts possible triggers that may cause a user's FM to flare up. For example, the biomarker modeling module 160 may receive user data describing a user's motion activity for a day and may predict whether a user is likely to experience a flare up within the next 24 hours based on the user's motion activity. Similarly, the biomarker modeling module 160 may determine that weather in the area near a user is likely to negatively impact the user's mental health, which may cause the user's FM to flare up. In some embodiments, the biomarker modeling module 160 may determine a likelihood that a user will experience a flare-up within a time period, and may approximate how severe the flare-up will likely be. In some embodiments, the biomarker modeling module 160 generates a flareup model for each user based on the respective user's data describing when the user experiences a flareup.

In some embodiments, the biomarker modeling module 160 determines a likelihood that the user has undiagnosed FM. The biomarker modeling module 160 may receive user data and determine a likelihood that the user has FM. If the likelihood exceeds some threshold, the biomarker modeling module 160 may alert the user that the user should go to a healthcare provider to receive an official diagnosis.

In some embodiments, the biomarker modeling module 160 determines whether a user's symptoms are caused by the user's FM or by pharmacological solutions the user is currently using. For example, certain pain medications may include some negative side effects like drowsiness or sedation, and a user may have difficulty determining whether their symptoms are caused by their FM or a pain medication they are taking for their FM. The biomarker modeling module 160 may determine a likelihood that a particular symptom is caused by the user's FM and may inform the user if the symptom is likely caused by a pharmacological solution instead.

In some embodiments, the biomarker modeling module 160 determines the level of mental health related to behavioral therapy skills, such as stress levels, coping skill levels, mindfulness, pain acceptance, sleep interference, pain interference, psychological flexibility, or level of committed action. The biomarker module 160 may alert the user that the user should make efforts to take action to positively modify these skills.

The treatment planning module 170 generates a treatment plan to a user of the digital therapy system 140 to alleviate a user's FM. A treatment plan is a set of one or more treatment assignments for the user to perform as part of treating or mitigating their FM in accordance with CBT techniques. A treatment assignment is an exercise or activity that assists the user in developing effective strategies for alleviating symptoms of FM. For example, treatment assignments may include exercises and activities such as talk therapy, skill building materials, mindfulness exercises, sleep planning, behavioral therapy tasks, physical movements, recommendations in favor or against certain activities, recommendations in favor or against certain pharmacological solutions to the user's symptoms, reading materials, presentations of a user's progress, or recommendations for diet changes.

The treatment planning module 170 applies one or more treatment planning models to generate a treatment plan for a user. A treatment planning model is one or more machine learning models (e.g., neural networks) that are trained to generate treatment plans for users of the digital therapy system 140 based on biomarker characteristics of the users determined by the biomarker modeling module 160. For example, a treatment planning model may be trained to generate a treatment plan for a user based on the severity of the user's FM as predicted by biomarker characteristics determined for that user. A treatment planning model may be trained to correlate biomarker characteristics of a user with other data to determine a treatment plan for the user. For example, a treatment planning model may be trained to correlate a user's biomarker characteristics with the efficacy of previous treatment assignments the user has performed and recent physical activity performed by the user to generate a treatment plan that may account for a flareup of a user's FM symptoms. The treatment planning model may also be trained to generate a treatment plan for a user based on previous treatment assignments completed by the user. For example, if the user has already completed basic treatment assignments, the treatment planning model may generate a treatment plan with more complex treatment assignments for the user.

The treatment planning model may be trained based on training data received by the treatment planning module 170. Training data for a treatment planning model may include biomarker characteristics of a user, weather data, location data, or data from studies conducted by third parties. In some embodiments, a treatment planning model may be trained based on user data from multiple users of the digital therapy system 140. In these embodiments, the treatment planning model may be trained to generate a treatment plan for one user based on the efficacy of treatment plans provided to similar users. For example, if a particular treatment assignment was effective with users with similar medical histories to the user, then the target planning model may generate a treatment plan for the user with the treatment assignment.

In some embodiments, the training data includes labels for training examples that are used to train a treatment planning model. For example, training data may include a set of training examples, where each example includes biomarker characteristics for a user. Each training example may be labeled with whether a particular treatment assignment was effective or with a set of scores indicating the efficacy of a set of associated treatment assignments.

In some embodiments, the training data for a treatment planning model may be preprocessed. For example, the treatment planning module 170 may featurize the training data, normalize the training data, remove training examples that are missing important pieces of information, or remove anomalous training data.

In some embodiments, to train a treatment planning model, the treatment planning module 170 generates feature sets of embeddings based on the training data. For example, the treatment planning module 170 may generate an embedding based on biomarker characteristics associated with a user and an embedding based on weather data, and these embeddings may be used to train a treatment planning model.

In some embodiments, the treatment planning module 170 may retrain a treatment planning model based on new data received by the digital therapy system 140 in the course of providing treatment to a user. For example, if a treatment planning model generates a treatment plan, and the user reports that the treatment assignments in the treatment plan are less effective than the treatment planning model predicted, then the treatment planning module 170 may retrain the treatment planning model based on the reported effectiveness of the treatment assignments in the treatment plan.

The training data may be received from user devices 100, provider devices 110, or remote databases 120. The training data also may include biomarker characteristics generated by the biomarker modeling module 160 or may include data on treatment assignments provided to the user. Additionally, the training data may include data from other users of the digital therapy system 140.

In some embodiments, the treatment planning module 170 adjusts a user's treatment plan based on additional data received by the treatment planning module 170. For example, the treatment planning module 170 may adjust the user's treatment plan in response to data that indicates a user's positive or negative reaction to treatment assignments, actions taken by the user that may cause a flare up, whether the user completes treatment assignments, level of engagement with the assignments, how often the user completes treatment assignments, how successfully a user performs a treatment assignments, a change in a user's pharmacological treatments, a change in how often a user administers a prescribed pharmacological treatment to themselves, an increased or decreased success rate of treatment assignments when performed by other users, or a change in the user's biomarker model.

The treatment planning module 170 may adjust the treatment plan for a user by changing which treatment assignments the treatment planning module 170 recommends to the user or changing how often the user should perform recommended treatment assignments. For example, if the treatment planning module 170 has consistently recommended reading materials to a user and the treatment planning module 170 determines that the user has not been reading the reading materials or that the reading materials have not been effective, the treatment planning module 170 may stop recommending reading materials to the user and may recommend alternative reading materials, audio or video exercises, or more talk therapy sessions instead.

In some embodiments, the treatment planning module 170 determines whether a user is disappointed with their progress with their treatment plan. The treatment planning module 170 may then provide the user with information about the user's progress to demonstrate that the user has made progress through their treatment plan. For example, the treatment planning module 170 may provide information to the user about how their pain severity has changed or how their mental health has changed, as reported by the user. The treatment planning module 170 may determine that a user is disappointed with their progress based on user reporting, a decrease in user engagement with their treatment plan, an attempt by a user to end treatment by the digital therapy system 140 entirely, or a temporary decrease in a user's progress in their treatment.

The treatment communication module 180 transmits a user's treatment plan to the user device 100. The treatment communication module 180 may transmit a user's full treatment plan to the user device 100 or may transmit individual treatment assignments to the user device 100 for the user to perform. The treatment communication module 180 may transmit data or information that is part of a recommended treatment assignment (e.g., the text of reading materials the user is recommended to read) or may transmit instructions to the user device 100 to collect the information or data from another source. In some embodiments, the treatment communication module 180 transmits instructions of a user interface to display to a user via the user device 100. The user interface may display to the user treatment assignments that the user is recommended to perform. The treatment communication module 180 also may transmit the treatment assignments to the user device 100 and the user device 100 generates a user interface to present the received treatment assignments using a client application operating on the user device 100.

The data store 190 stores data for the digital therapy system 140. The data store 190 includes one or more computing devices that are configured to store data for the digital therapy system 140. The data store 190 may store data in one or more databases operating on one or more computing devices. The data store 190 may store data received from the user device 100, the provider device 110, or the remote databases 120. The data store 190 also may store biomarker models generated by the biomarker modeling module 160 or treatment planning models generated by the treatment planning module 190.

User Clustering

In some embodiments, the digital therapy system 140 uses user clusters to develop treatment plans for users. The digital therapy system 140 may apply a biomarker model to user data collected about a user to generate biomarker characteristics for the user. The digital therapy system 140 may compare the biomarker characteristics for the user to biomarker characteristics associated with other users and generate user clusters based on the similarities of biomarker characteristics of users of the digital therapy system 140. A user cluster is a set of users of the digital therapy system 140 that are associated with similar biomarker characteristics and are likely to respond similarly to a treatment plan.

The digital therapy system 140 may then generate a treatment plan for users in a user cluster based on the biomarker characteristics of the users in the user cluster. The digital therapy system 140 may provide the same treatment plan for all users in the user cluster. In some embodiments, the digital therapy system 140 provides different treatment plans to different users in a user cluster, evaluates the performance of treatment assignments in treating different users in the user cluster, and adjusts the treatment plan provided to each user in the user cluster based on the performance of the treatment assignments.

In some embodiments, the digital therapy system 140 generates a success score for a user. A success score is a measure of a predicted outcome of a user's treatment through a treatment plan. For example, a success score may represent a predicted reduction in mental health issues, an increase in physical activities, or reduced side effects of a medication. The digital therapy system 140 may compare a user's progress to a success score assigned to the user to determine whether the user's treatment plan needs to be adjusted. For example, if a user's treatment plan has focused on encouraging the user to partake in more physical activities, but the user has not progressed as much as their success score would suggest that the user should, then the digital therapy system 140 may determine that the user's treatment plan may need to focus on different treatment assignments (e.g., talk therapy).

Example Method for Implementing a Treatment Plan by a Digital Therapy System

Figure 2:
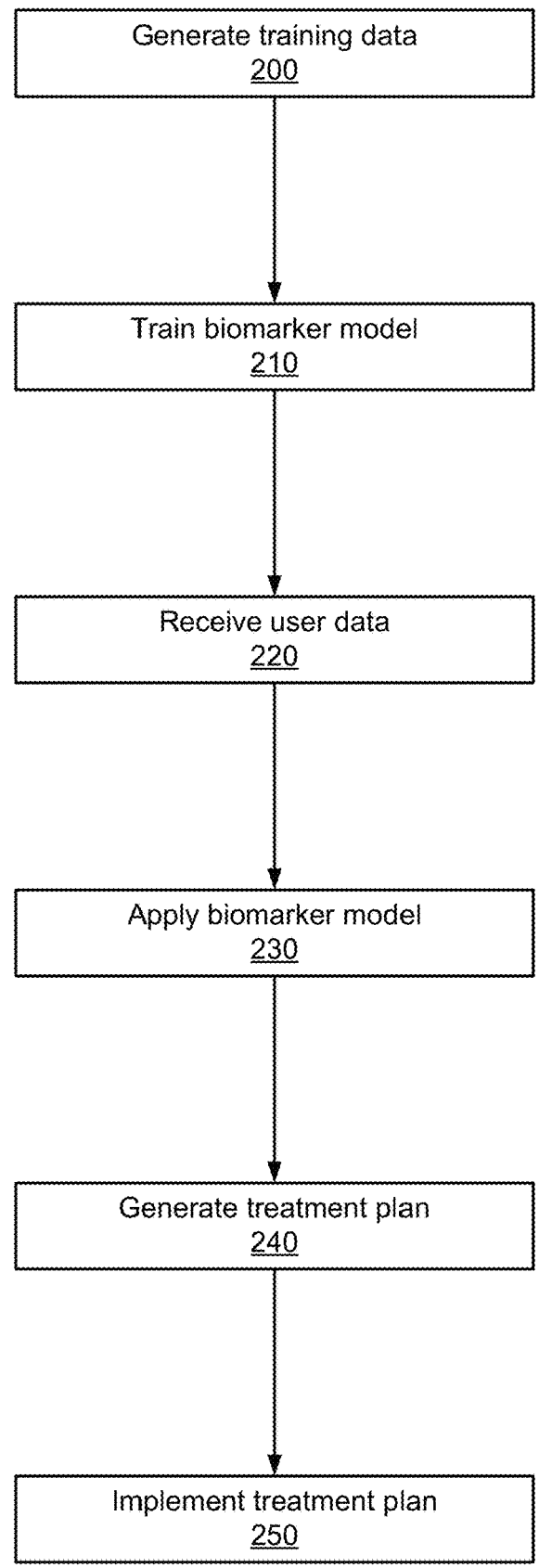
FIG. 2 is a flowchart illustrating an example method for implementing a treatment plan by a digital therapy system, in accordance with some embodiments.

FIG. 2 is a flowchart illustrating an example method for implementing a treatment plan by a digital therapy system, in accordance with some embodiments. Alternative embodiments may include more, fewer, or different steps from those illustrated in FIG. 2, or may perform the steps in a different order from that illustrated in FIG. 2.

A digital therapy system generates 200 training data for a biomarker model and trains 210 the biomarker model based on the training data. The digital therapy system receives 220 user data for a user with FM. The digital therapy system may receive the user data from a user device associated with the user. The digital therapy system applies 230 the trained biomarker model to the user data to predict the onset of one or more FM symptoms and to produce a set of biomarker characteristics that describe characteristics of the user's FM symptoms. In some embodiments, the digital therapy system clusters users together based on their biomarker characteristics to generate user clusters.

The digital therapy system generates 240 a treatment plan with one or more treatment assignments for the user. The digital therapy system may generate the treatment plan for a user by applying a treatment planning model to the biomarker characteristics for the user. In some embodiments, the digital therapy system generates a treatment plan for the user based on a user cluster with which the user is associated. The digital therapy system implements 250 the treatment plan. The digital therapy system may implement the treatment plan by transmitting the treatment plan to a user device 100 or an update to the provider via provider device 110. The digital therapy system also may implement the treatment plan by transmitting a notification to the user that the user may experience a flareup of FM symptoms, transmitting an instruction to the user to perform one or more physical movements, transmitting an instruction to the user to administer one or more medications, or modifying a prescription of the user.

Example User Application

Figure 3:
FIG. 3 illustrates example user interfaces in a user application, in accordance with some embodiments.

FIG. 3 illustrates example user interfaces in a user application, in accordance with some embodiments. For example, the user application may present a user interface 300 for starting the tasks that the user has been assigned for a day. The user application may then present a user interface for different tasks for the user to perform. For example, the user application may present user interfaces for video tasks 310, audio tasks 320, or journaling tasks 330. Additionally, the user application may provide a user interface 340 with tasks that the user can perform for when the user has a flareup. The user application may display this user interface 340 in response to the digital therapy system 140 predicting that the user will have a flareup within a certain time period. Alternatively, the user application may allow the user to access this user interface 340 anytime through a shortcut 350.

Additional Considerations

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

What is claimed is:

1. A method comprising:
   storing, by a digital therapy system, a first machine-learned model that is configured to output a prediction of an onset of one or more symptoms of fibromyalgia and a set of biomarker characteristics that describe characteristics of the one or more fibromyalgia symptoms based on an input of user data describing a user of the digital therapy system, wherein the first machine-learned model is trained by a process comprising:
      generating, by the digital therapy system, a training set of data comprising characteristics of a population of users with fibromyalgia and characteristics of symptoms of the users' fibromyalgia; and
      training, by the digital therapy system, a first machine-learned model using the training set of data and configured to predict an onset of one or more symptoms of fibromyalgia for a target user based on characteristics of the target user;
   storing, by the digital therapy system, a second machine-learned model that is configured to generate treatment plans based on predictions of onsets of symptoms of fibromyalgia and biomarker characteristics output by the first machine-learned model, wherein the second machine-learned model trained using a second training set of data comprising historical symptoms of fibromyalgia of a set of training users, treatment actions performed by the set of training users, and measures of efficacy of the treatment actions at reducing effects of the fibromyalgia;
   receiving, at the digital therapy system, user data from a user device associated with a user with fibromyalgia, the user data comprising data that describes one or more physical health characteristics or mental health characteristics of the user;
   applying the first machine-learned model to the received user data, the first machine-learned model configured to predict an onset of one or more fibromyalgia symptoms based on the received user data and to produce a set of biomarker characteristics that describe characteristics of the one or more fibromyalgia symptoms;
   generating a treatment plan for the user comprising one or more cognitive behavioral therapy (CBT) treatment assignments by applying the second machine-learned model to the biomarker characteristics of the user output by the first machine-learned model;
   transmitting instructions to the user device associated with the user to execute the treatment plan;

executing the treatment plan at the user device by displaying a user interface for each of the one or more CBT treatment assignments;

receiving additional user data from the user device associated with the user, wherein the additional user data describes interactions of the user with user interfaces for the one or more CBT treatment assignments;

applying the first machine-learned model to the additional user data to generate an updated set of biomarker characteristics for the user;

determining, based on the updated set of biomarker characteristics generated by the first machine-learned model, that the user is likely to experience a flare up of fibromyalgia symptoms within a time period;

generating an adjusted treatment plan by applying the second machine-learned model to the updated set of biomarker characteristics, the adjusted treatment plan comprises one or more CBT treatment assignments selected to prevent or alleviate the flare up;

transmitting instructions to the user device associated with the user to execute the treatment plan; and executing the adjusted treatment plan at the user device by:
  displaying a user interface for each of the one or more CBT treatment assignments; and
  receiving a user interaction with each of the displayed user interfaces for each of the one or more CBT treatment assignments, wherein each user interaction indicates a performance of the corresponding CBT treatment assignment by the user.

2. The method of claim 1, wherein the biomarker characteristics indicate a first set of user symptoms that are likely caused by fibromyalgia and a second set of user symptoms that are likely caused by a pharmacological medication taken by the user.

3. The method of claim 1, wherein the user data comprises user responses to questions provided to the user by the user device.

4. The method of claim 1, wherein the biomarker characteristics indicate at least one of a severity of the fibromyalgia of the user or locations on the user where the user experiences pain due to the fibromyalgia.

5. The method of claim 1, wherein the one or more CBT treatment assignments comprises at least one of a meditation session, a talk therapy session, audio or video exercises, or reading materials.

6. The method of claim 1, wherein executing the treatment plan comprises displaying the treatment plan to the user.

7. The method of claim 1, wherein the one or more CBT treatment assignments comprises an instruction to the user to perform one or more physical movements or activities.

8. The method of claim 1, wherein the one or more CBT treatment assignments comprises an instruction to the user to administer one or more medications.

9. The method of claim 1, wherein executing the treatment plan comprises modifying a prescription of the user.

10. The method of claim 1, wherein executing the treatment plan comprises transmitting a notification to the user describing a prediction that the user is likely to experience a flare-up of fibromyalgia symptoms within a time period.

11. The method of claim 1, wherein executing the treatment plan comprises displaying a notification to the user describing a progress of the user through the treatment plan.

12. A non-transitory computer-readable medium comprising instructions that, when executed by a processor, cause the processor to:

store, by a digital therapy system, a first machine-learned model that is configured to output a prediction of an onset of one or more symptoms of fibromyalgia and a set of biomarker characteristics that describe characteristics of the one or more fibromyalgia symptoms based on an input of user data describing a user of the digital therapy system, wherein the first machine-learned model is trained by a process comprising:
  generating, by the digital therapy system, a training set of data comprising characteristics of a population of users with fibromyalgia and characteristics of symptoms of the users' fibromyalgia; and
  training, by the digital therapy system, a first machine-learned model using the training set of data and configured to predict an onset or one or more symptoms of fibromyalgia for a target user based on characteristics of the target user;

store, by the digital therapy system, a second machine-learned model that is configured to generate treatment plans based on predictions of onsets of symptoms of fibromyalgia and biomarker characteristics output by the first machine-learned model, wherein the second machine-learned model trained using a second training set of data comprising historical symptoms of fibromyalgia of a set of training users, treatment actions performed by the set of training users, and measures of efficacy of the treatment actions at reducing effects of the fibromyalgia;

receive, at the digital therapy system, user data from a user device associated with a user with fibromyalgia, the user data comprising data that describes one or more physical health characteristics or mental health characteristics of the user;

apply the first machine-learned model to the received user data, the first machine-learned model configured to predict an onset of one or more fibromyalgia symptoms based on the received user data and to produce a set of biomarker characteristics that describe characteristics of the one or more fibromyalgia symptoms;

generate a treatment plan for the user comprising one or more cognitive behavioral therapy (CBT) treatment assignments by applying the second machine-learned model to the biomarker characteristics of the user output by the first machine-learned model;

transmit instructions to the user device associated with the user to execute the treatment plan;

execute the treatment plan at the user device by displaying a user interface for each of the one or more CBT treatment assignments;

receive additional user data from the user device associated with the user, wherein the additional user data describes interactions of the user with user interfaces for the one or more CBT treatment assignments;

apply the machine-learned model to the additional user data to generate an updated set of biomarker characteristics for the user;

determining, based on the updated set of biomarker characteristics generated by the first machine-learned model, that the user is likely to experience a flare up of fibromyalgia symptoms within a time period;

generate an adjusted treatment plan by applying the second machine-learned model to the updated set of biomarker characteristics, the adjusted treatment plan comprises one or more CBT treatment assignments selected to prevent or alleviate the flare up;

transmit instructions to the user device associated with the user to execute the adjusted treatment plan; and execute the adjusted treatment plan at the user device by:
- displaying a user interface for each of the one or more CBT treatment assignments of the adjusted treatment plan; and
- receiving a user interaction with each of the displayed user interfaces for each of the one or more CBT treatment assignments, wherein each user interaction indicates a performance of the corresponding CBT treatment assignment by the user.

13. The computer readable medium of claim 12, wherein the biomarker characteristics indicate a first set of user symptoms that are likely caused by fibromyalgia and a second set of user symptoms that are likely caused by a pharmacological medication taken by the user.

14. The computer-readable medium of claim 12, wherein the user data comprises user responses to questions provided to the user by the user device.

15. The computer-readable medium of claim 12, wherein the biomarker characteristics indicate at least one of a severity of the fibromyalgia of the user or locations on the user where the user experiences pain due to the fibromyalgia.

\* \* \* \* \*